United States Patent Office 3,501,405
Patented Mar. 17, 1970

3,501,405
LUBRICATING AND FUEL COMPOSITIONS COMPRISING COPOLYMERS OF N-SUBSTITUTED FORMAMIDE-CONTAINING UNSATURATED ESTERS
Gordon L. Willette, Philadelphia, Pa., assignor to Rohm and Haas Company, Philadelphia, Pa., a corporation of Delaware
No Drawing. Filed Aug. 11, 1967, Ser. No. 659,898
Int. Cl. C10l *1/14*; C10m *1/28*
U.S. Cl. 252—51.5         5 Claims

ABSTRACT OF THE DISCLOSURE

This invention relates to useful esters of unsaturated carboxylic acids, their addition polymers, and methods of preparing the esters. The invention further deals with lubricating and fuel compositions having incorporated therein the polymers which impart thereto dispersant and other beneficial properties.

---

The novel esters of this invention may be represented by the following formula:

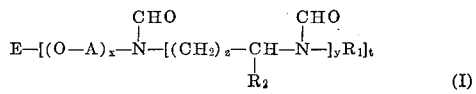

(I)

wherein:

E represents an acyl radical that is the residue of a lower unsaturated monocarboxylic acid, a lower unsaturated dicarboxylic acid, or a lower unsaturated dicarboxylic acid half ester,
A is alkylene,
$R_1$ is hydrocarbon,
$R_2$ is hydrogen or methyl,
$t$, $x$, $y$, and $z$ are integers, and
$y$ may be zero.

BACKGROUND OF THE INVENTION

Much study and research has been directed to the problem of dispersing gums, resins and other substances which may be present or be formed in liquid petroleum products. There is the problem on the one hand of dispersing such materials in kerosene, fuel oils, jet fuels, and other combustible hydrocarbon liquids. On the other hand, there is the problem of dispersing such materials when they occur or as they are formed in lubricating oils. Although various types of materials have been used in an attempt to alleviate these problems, many of these materials have not been especially effective as dispersants at low temperatures or under conditions where engines are operated intermittently. There is a particular need for ashless dispersants which are effective at low operating temperatures of gasoline and compression-ignition engines and under conditions of intermittent service or so-called stop and go driving. At the same time such a dispersant must withstand conditions of relatively high temperature operation. It must resist shear and oxidation and be compatible with at least some other additives which are now required in oils, such as anti-oxidants, stabilizers, wear resistant agents, other detergents, especially heavy duty detergents, anti-rust agents, pour-point depressants, viscosity index improvers, anti-foam agents or dyes. It would be desirable to have agents which act not only as dispersants but also for one or more of the purposes of the various other additives. The novel copolymers of this invention are particularly valuable as sludge dispersants but they also impart other beneficial properties, including improvements in detergency, viscosity, viscosity-temperature relationships, and pour depressancy action. Dispersants are employed as additives of lubricating oils so that the oil-insoluble foreign matter and sludge will remain suspended in the oil and not deposit on any of the vital engine parts.

SUMMARY OF THE INVENTION

This invention relates to novel and useful esters of unsaturated carboxylic acids, their addition polymers, and methods of preparing the novel esters. The invention further deals with lubricating and fuel compositions having incorporated therein the novel polymers which impart thereto dispersant and other beneficial properties.

The novel esters whose polymers are used in the lubricating and fuel compositions of this invention may be represented by the following formula:

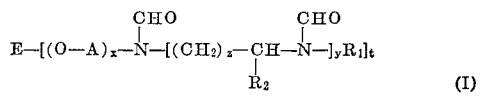

(I)

wherein:

E represents an acyl radical that is the residue of an unsaturated monocarboxylic acid having up to 6 carbon atoms, a lower unsaturated dicarboxylic acid, or a lower unsaturated dicarboxylic acid half ester of a ($C_1$ to $C_{24}$)alkanol,
A is an alkylene group having 2 to 4 carbon atoms,
$R_1$ is a ($C_1$ to $C_{24}$)-alkyl group, a ($C_5$ to $C_7$)-cyclic aliphatic group, phenyl, benzyl, or a ($C_1$ to $C_4$)-alkyl substituted phenyl,
$R_2$ is hydrogen or methyl,
$t$ is an integer having a value of from 1 to 2,
$x$ is an integer having a value of from 1 to 30, preferably 1 to 4,
$y$ is an integer having a value of from 0 to 4, and
$z$ is an integer having a value of from 1 to 5.

All of the esters within the scope of said formula may be homopolymerized, or copolymerized with one or more other ethylenically unsaturated monomers, by conventional techniques.

The copolymers of this invention which are useful for supplying dispersancy and other valuable properties to both lubricating oils and fuels are prepared from at least 0.4% by weight of the novel ester monomer and at least one alkyl acrylate or alkyl methacrylate having alkyl groups of sufficient size on average to ensure solubility in the liquid petroleum product to be treated. The desirable properties such as dispersancy which are imparted to lubricating oil and fuel compositions are obtained when an N-substituted formamide copolymer within the scope of this invention is employed in lubricating oils in amounts of from about 0.1 to 10% by weight and to fuel compositions when the N-substituted formamide copolymer of this invention is employed in amounts from about 0.001% to 0.1% by weight.

DESCRIPTION OF THE INVENTION

This invention relates to novel and useful esters of unsaturated carboxylic acids, their addition polymers, and methods of preparing the novel esters. The invention further deals with lubricating and fuel compositions having incorporated therein the novel polymers which impart thereto dispersant and other beneficial properties.

The novel esters of this invention may be represented by Formula I wherein E represents an acyl radical of the following type of unsaturated carboxylic acids and anhydrides: acrylic acid, methacrylic acid, crotonic acid, 4-pentenoic acid, 3-pentenoic acid, 5-hexenoic acid, 2-methyl-4-pentenoic acid, 3 - methyl - 4 - pentenoic acid, fumaric acid, methylfumaric acid (mesaconic acid), itaconic acid, maleic anhydride, and citraconic anhydride. E may also represent an acyl radical of the alkyl half ester of a dicarboxylic acid wherein the alkyl moiety contains from 1 to 24 carbon atoms. An acyl radical that is the residue of an unsaturated dicarboxylic acid may be represented by the structures:

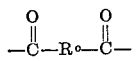

or

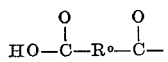

wherein $R^o$ is an unsaturated divalent hydrocarbon radical. In the first structure $t$ of Formula I will be 2 and in the latter structure, $t$ will be 1.

An acyl radical that is the residue of an unsaturated dicarboxylic acid half ester may be represented by the structure

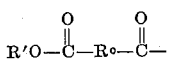

wherein $R^o$ is as previously defined and $R'$ is an alkyl radical having from 1 to 24 carbon atoms.

Typically A will represent ethylene, butylene or propylene. Representative $R_1$ groups are methyl, ethyl, butyl, octyl, decyl, dodecyl, tetradecyl, octadecyl, tetracosyl, cyclopentyl, cyclohexyl phenyl, methylphenyl, butylphenyl, xylyl, dibutylphenyl and benzyl.

The novel monomeric esters from unsaturated monocarboxylic acids, unsaturated dicarboxylic acids, and unsaturated dicarboxylic acid half esters may be prepared by a variety of methods. For example, a preferred embodiment is the transesterification of an ester of the formula

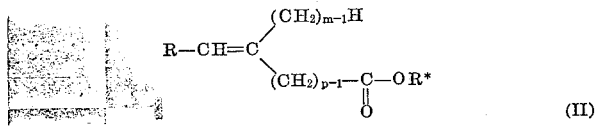

wherein:

R is selected from the group consisting of hydrogen and methyl, $m$ is an integer having a value of 1 to 3, preferably 1–2, $p$ is an integer having a value of 1 to 4, and R* is any hydrocarbon radical, but preferably is derived from a saturated lower ($C_1$ to $C_6$) aliphatic alcohol such as methanol, ethanol, isopropanol or butanol, with an N-substituted formamide of the formula

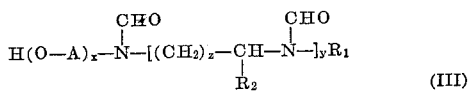

wherein A, $R_1$, $R_2$, $x$, $y$ and $z$ are as previously defined. To prepare dicarboxylic acid diesters of a Formula III compound, about one mole of a lower alkyl ester of an unsaturated dicarboxylic acid such as dimethyl fumarate is transesterified with about two moles of a Formula III compound. In a similar manner itaconates and maleates may be employed. The reaction is effected under alkaline conditions in the presence of about ½% to 10%, and preferably 1 to 5%, by weight, based on the weight of the starting alcohol, of a tetraalkyl titanate, such as the tetraisopropyl or tetrabutyl titanate. No solvent is needed. While the starting materials may be employed in stoichiometrically equivalent amounts, it is preferred that the ester be employed in excess. The alcohol liberated during the transesterification is removed by azeotropic distillation of a mixture of the alcohol and the starting monomeric ester, such as methyl methacrylate or methyl acrylate. It is not necessary but sometimes desirable that a polymerization inhibitor be employed such as para-hydroxydiphenylamine or diphenylphenylenediamine. The reaction is generally carried out at temperatures of about 100 to 130° C. and the completion of the reaction can be determined by measuring the amount of alcohol removed and thereby determining when the theoretical amount of alcohol liberated has been taken out of the system by distillation.

Instead of using tetraalkyl titanate, the transesterification may be carried out in the presence of an alkali metal ($C_1$–$C_4$)-alkoxide, the amount thereof varying from 0.2% to 5%, and preferably 1 to 3%, based on the weight of the starting alcohol. Whereas the metal alkoxide system is applicable to the preparation of any of the esters, the tatraalkyl titanate is preferred for the transesterification of acrylates and methacrylates. Sodium methoxide or ethoxide as well as the potassium and lithium analogs may be employed. In this system, the ester and the N-substituted hydroxyformamide are mixed and a solution of the alkoxide in an alcohol such as methanol is added gradually. No additional solvent is needed, the ester itself serving this purpose. The temerpature may be from 100° to 140° C. and is preferably not over 130° C.

The esters, and preferably the methyl or ethyl esters, of the following unsaturated acids are representative of those that may be used: acrylic methacrylic, crotonic, 4-pentenoic, 3-pentenoic, 5-hexenoic, 2-methyl-4-pentenoic, 3-methyl-4-pentenoic, fumaric and itaconic.

An alternate method of preparing the compounds of Formula I is by reacting an acyl halide of (a) an unsaturated monocarboxylic acid, (b) an unsaturated dicarboxylic acid or (c) an unsaturated dicarboxylic acid half ester with a formamide of Formula III, for example, an acyl halide of the formula

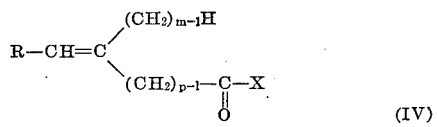

wherein $m$, $p$, and R are as previously defined and X is a halogen atom, e.g., chlorine or bromine, with the N-substituted formamide of Formula III above. This reaction is carried out at temperatures from $-10°$ C. to 130° C. with an organic or inorganic base present in sufficient amount to accept the hydrogen halide developed during the reaction. The acyl halide and the alcohol of Formula III are generally used in approximately stoichiometric equivalent amounts. If desired an inert solvent may be used. Examples of solvents include chloroform, carbon tetrachloride, methylene dichloride, ethylene dichloride, toluene, xylene, acetonitrile, and dioxane. The product is recovered by separating the salt formed from the ester product.

Acyl halides of the aforementioned unsaturated dicarboxylic acids may be employed in a manner similar to the Formula IV compounds except that at least two moles of a Formula III compound are used per mole of dibasic acid halide. Also acyl halides of half esters of unsaturated dicarboxylic acids (i.e. where only one acid function is esterified with an alkyl group) may be esterified with a Formula III compound. The alkyl group of the unsaturated dicarboxylic half-ester may contain from 1 to 24 carbons.

Another alternate method of preparing the novel unsaturated esters containing an N-substituted formamide described in Formula I is by direct esterification according to conventional techniques.

The N-substituted formamides of Formula III are generally a known class of compounds. When, in Formula III, $x$ is 1 and $y$ is 0, the formamides may be obtained by the reaction in conventional fashion of an N-substituted aminoalkanol and carbon monoxide in the presence of a catalyst and a solvent. N-methyl-N-hydroxyethylformamide may be prepared from methylaminoethanol and carbon monoxide using a methanol solvent and a methanolic 50% chlorine solution as a catalyst. This reaction is described in U.S. Patent No. 2,793,211.

The general class of N-substituted formamides of Formula III when $x$ is two or more, $y$ is one or more and $R_1$ is a hydrocarbon radical may be prepared by well known methods. For example, an aminoalkanol, i.e. HOCH₂—CH₂NH₂, HO—CH₂CH₂CH₂—NH₂ etc., is reacted with y moles of propylene imine to give the corresponding hydroxypolyaminoalkylene compound, i.e.

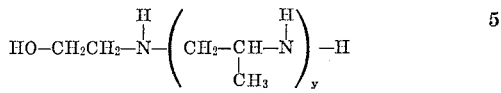

Alkylation of the primary amine may be achieved with the appropriate halide ($R_1X$, wherein $R_1$ is as previously defined and X is the chloride or bromide) in the presence of a hydrogen halide acceptor such as sodium carbonate, to yield the following:

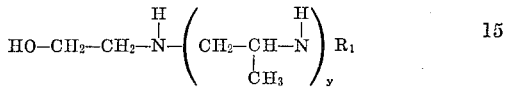

Representative halides are methyl chloride, butyl chloride, decyl chloride and benzyl chloride. Formylation of this intermediate can be carried out readily with ethyl formate at reflux temperatures or with formic acid at reflux temperatures. Condensation with the appropriate alkylene oxide or diol, i.e. ethylene oxide, isopropylene oxide, 1,3-propylene diol etc., in the presence of an acid catalyst, i.e. p-toluene sulfonic acid will then result in the desired N-substituted formamide. The class of compounds of Formula III when y and z are more than 1 or even when y or z are one may be prepared by starting with an appropriate alkylenepolyamine and reacting this with the desired alkyl halide in the presence of an acid acceptor such as sodium carbonate. The resulting N-substituted alkylene polyamine is then reacted with an alkylene oxide such as ethylene oxide and this product is subsequently formylated to yield the desired Formula III compound. Representative alkylenepolyamines include ethylene diamine, diethylenetriamine, triethylenetetramine, tetraethylenepentamine and hexamethylene diamine.

The following preparations are illustrative of well known methods for forming the Formula III compounds.

Preparation A

A 3-neck round bottom flask was equipped with a thermometer, stirrer and reflux condenser. There were added to the flask 116 g. of hexamethylene diamine, 176 g. of n-decyl chloride, 50 g. of benzene and a solution containing 55 g. of sodium carbonate. The solution was brought to benzene reflux and held there approximately one hour. The reaction mixture was cooled, the benzene layer separated and in a suitable distillation apparatus the benzene was stripped off to leave a residue containing N-decylhexamethylene diamine. This residue was then added to a 3-neck flask equipped with a thermometer, stirrer and gas inlet-exit tubes. Ethylene oxide was bubbled through this mixture at 130° C. The product of the following structure was isolated

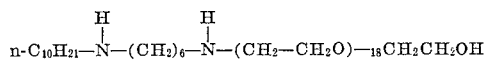

To the N-polyethoxy-N'-decyl hexamethylene diamine in benzene was added 110 g. of ethyl formate. The solution was heated to benzene reflux and held there for 2 hours. The reflux condenser was then removed and the benzene, ethanol and unreacted ethyl formate were stripped from the mixture. The residue contained the desired product N-formyl-N-hydroxyethyl(polyoxyethyl)₁₈-N'-formyl-N'-decyl hexamethylene diamine of the following structure:

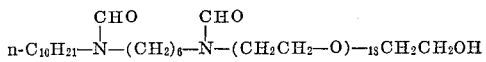

Preparation B

A 3-neck round bottom flask was equipped with a thermometer, gas inlet tube, stirrer and reflux condenser. There were added to the flask 130 g. of n-octylamine and 32 g. of benzene. Propylene imine was then fed into the solution at ambient temperature. The major product isolated from the mixture was 2[2-(2-octylaminoisopropylamino)isopropylamino]isopropylamine and has the following structure:

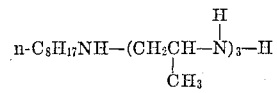

This tetraamine (175 g.) was dissolved in benzene in a 3-neck flask equipped with a thermometer, gas inlet-exit tubes and stirrer. Ethylene oxide was passed into the system held near ambient temperature such that the mono adduct was formed. Formic acid (162 g.) was added to the monoethylene oxide added and the solution was held at benzene reflux for 3 hours. The product isolated from this reaction was 3,6,9,12-tetraazaformyl-4,7,10-trimethyleicosyl alcohol and had the following structure:

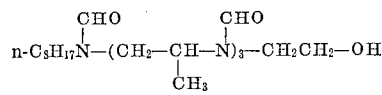

Preparation C

A 3-neck round bottom flask was equipped with a thermometer, stirrer and reflux condenser. There were added to the flask 22.5 g. of 2-aminoethanol, 10 g. of benzene, 32 g. of ethyl chloride and a solution containing 27 g. of sodium carbonate. The solution was brought to benzene reflux and held there for 0.5 hour. The reaction mixture was cooled, the benzene layer was separated and in a suitable distillation apparatus the benzene was removed by distillation. There was added to the residue 48 g. of ethyl formate and the temperature was increased to 50° C. and the mixture was stirred at this temperature for 1 hour. Unreacted ethyl formate and ethanol were stripped from the reaction mixture to leave approximately 90 g. of crude N-(2-hydroxyethyl)-N-ethylformamide.

The following preparations are directed to forming the monomers of Formula I.

Preparation D

N-methacryloxyethyl - N - methylformamide was prepared by transesterification as follows:

To a one liter three-neck, round bottom flask equipped with a stirrer, thermometer, and a 35 cm. helix packed column fitted with an automatic take-off distilling head were charged 206 g. (2.0 moles) of N-methyl-N-hydroxyethylformamide, 420 g. (4.2 moles) of uninhibited methyl methacrylate, and 4 g. of diphenylphenylenediamine. The mixture was heated with stirring and methyl methacrylate and any water present were distilled off at 98 to 100° C. until 22 g. of distillate had collected. The mixture was allowed to cool and 5.190 g. of tetraisopropyl titanate catalyst was added. The methanol-methyl methacrylate azeotrope was distilled off at a pot temperature from 104–116° C. and the distillate boiled at 64–70° C.

Five grams of diphenylphenylenediamine was added to the reaction mixture and methyl methacrylate was distilled off at water pump pressure. The residue was distilled through a short Vigreaux column at high vacuum to give 270.4 g. of N-methacryloxyethyl-N-methylformamide with the following physical properties: B.P. 110–111° C. at 0.7 mm. Hg, $n_D^{25} = 1.4695$.

*Elemental analysis.*—Calc'd for $C_8H_{13}NO_3$ (percent): C, 56.12; H, 7.65; N, 8.18. Found (percent): C, 56.12; H, 7.70; N, 8.47.

Preparation E

N-methacryloxyethyl-N-methylformamide was prepared by direct esterification as follow:

A three-neck round bottom flask was equipped with a stirrer, thermometer, and a Dean-Stark tube fitted with a reflux condenser. There were charged to the flask 206 g. (2.0 moles) of N-(2-hydroxyethyl)-N-methylformamide, 125 g. of toluene (reagent grade), 3.4 g. of diphenylphenylenediamine, 7.6 g. (0.04 mole) of p-toluene sulfonic acid monohydrate and 198 g. (2.30 moles) of glacial methacrylic acid. The mixture was heated at reflux to effect the separation of water. After approximately 20 hours and accompanied by a pot temperature increase from 130° C. to 146° C., two moles of water was collected. The batch was cooled to 80° C. and 3.2 g. of sodium hydroxide (50% solution) was added to the reaction mixture to neutralize the catalyst. Toluene and unreacted methacrylic acid were distilled from the mixture at reduced pressure, 2 mm. Hg and 110–115° C. The residue was filtered at ambient temperature to remove insoluble salts. The filtrate was distilled through a short Vigreaux column to give N-methacryloxyethyl-N-methylformamide, B.P. 120.5–122° C. at 1.2 mm. Hg.

Preparation F

The procedure of Preparation D was followed by using as reactants 2.0 moles of N-(2-hydroxyethyl)-N-methylformamide and 4.1 moles of methyl 5-hexenoate to produce N-(5-hexenoyloxyethyl)-N-methylformamide.

Preparation G

To produce N-(3-pentenoyloxyethyl)-N-phenylformamide, the procedure of Preparation D was followed using as reactants 2.0 moles of N-phenyl-N-hydroxyethylformamide and 2.5 moles of methyl 3-pentenoate.

Preparation H

To a 500 ml. three-neck, round bottom flask equipped with a stirrer, thermometer, and a 35 cm. helix packed column fitted with an automatic take-off distilled head were charged 142 g. (1.1 moles) of N-n-butyl-N-hydroxylethylformadie, 79 g. (0.5 mole) of uninhibited dimethyl itaconate, 10 g. of benzene and 0.1 g. of diphenylphenylenediamine. The mixture was heated with stirring and any water present was removed in the benzene-water azeotrope at 77–80° C. After most of the benzene had been removed the mixture was allowed to cool to 70° C. and 4.85 g. of tetraisopropyl titanate catalyst was added. The pot temperature was increased to 80–100° C. and the reaction continued until all the methanol and residual benzene were distilled off.

The residue was dissolved in benzene and extracted with an qaueous sodium carbonate solution. The benzene was dried over magnesium sulfate, the benzene was removed by distillation 119 g. of amber residue remained representing approximately a 62% yield of crude di(3-aza-3-formyl-heptyl)itaconate.

Preparations I

A mixed ester of fumaric acid was prepared in a three-neck, round bottom flask equipped with a stirrer, thermometer, and a Dean-Stark tube fitted with a reflux condenser. There were charged to the flask 116 g. (1.0 mole) of fumaric acid, 102 g. (1.0 mole) of n-hexyl alcohol, 3.8 g. (0.02 mole) of p-toluene sulfonic acid monohydrate and 70 g. of reagent grade toluene. The mixture was heated at reflux to effect the separation of water. After approximately one mole of water was collected the reaction was cooled to room temperature. The pot residue was extracted with a 10% sodium hydroxide solution. The aqueous layer was separated and neutralized with sulfuric acid. The neutralized solution was extracted with toluene. The toluene solution was dried over magnesium sulfate. There were charged to the toluene solution 131 g. (1.0 mole) of N-(2-hydroxyethyl)-N-(n-propyl)-formamide, and 3.8 g. (0.02 mole) of p-toluene sulfonic acid monohydrate. The mixture was heated at reflux to effect separation of water. After approximately one mole of water was collected the batch was cooled to 80° C. and 10 g. of sodium hydroxide (50% solution) was added to neutralize the catalyst and any unreacted acid. The aqueous layer was separated and toluene was removed from the reaction mixture by distillation at reduced pressure, 1.8 mm. Hg and 107–115° C. The residue, 166 g., was light brown and represented a 53% yield of crude hexyl (3-aza-3-formyl-hexyl)fumarate.

All of the monomers within the scope of Formula I may be polymerized to form homopolymers or copolymerized with one or more ethylenically unsaturated polymerizable monomers using conventional free-radical initiators, anionic initiators and high-energy irradiation. The polymerization may be effected by solution, emulsion, or suspension techniques, depending upon the nature of the monomer and of the polymer desired.

Suitable as comonomers are alkyl and aryl acrylates in which the alkyl or aryl portion contains from 1 to 24 carbon atoms; alkyl and aryl methacrylates in which the alkyl or aryl portion contains from 1 to 24 carbon atoms; acrylonitrile; methacrylonitrile, alkylaminoalkyl and dialkylaminoalkyl acrylates and methacrylates; acrylamide and methacrylamide and their N-alkyl substituted derivatives; styrene and alkyl ring-substituted styrenes containing no more than a total of about 20 carbon atoms; α-methylstyrene; vinyl esters, in which the carboxylate portion contains 1 to 24 carbon atoms, including the carbon of the carboxylate functions; vinyl alkyl ethers and vinyl alkyl sulfides in which the alkyl portion contains no more than 18 carbon atoms and N-vinyl lactams, preferably containing from 6 to 20 carbon atoms; alkyl vinyl sulfones in which the alkyl portion contains up to about 18 carbon atoms; N-vinylalkyleneureas containing from 5 to 12 carbon atoms; olefins, such as isobutylene, butadiene and isoprene; dialkyl fumarates of up to 24 carbon atoms; dialkyl maleates of up to 24 carbon atoms; dialkyl itaconates of up to 24 carbon atoms; dialkyl mesaconates of up to 24 carbon atoms; dialkyl mesaconates of up to 24 carbon atoms; dialkyl citraconates of up to 24 carbon atoms; and vinylpyridines.

In the above monomers, the alkyl groups may exhibit any possible spatial configuration, such as normal, iso, or tertiary. These alkyl groups may be acyclic or cyclic, including alkyl-substituted cyclic, as long as the total carbon content conforms to the defined amount. In the ring-substituted styrenes, the substituents may occupy any possible ring location or locations and when the substituents are alkyl groups, they may have any possible spatial configuration.

Typical of the above monomers that may be employed are methyl acrylate, isopropyl acrylate, cyclopentyl acrylate, 2-ethylhexyl acrylate, decyl acrylate, dodecyl acrylate, octadecyl acrylate, methyl methacrylate, t-butyl methacrylate, cyclohexyl methacrylate, octyl methacrylate, undecyl methacrylate, dodecyl methacrylate, phenyl methacrylate, dimethylaminoethyl methacrylate, methoxyethoxyethyl methacrylate, t-butylaminoethyl methacrylate, t-dodecylaminoethyl acrylate, octadecyl methacrylate, acrylonitrile, methacrylonitrile, N,N-dibutyl acrylamide, acrylamide, N-methylacrylamide, N-t-octylacrylamide, styrene, p-butylstyrene, p-octylstyrene, o-chlorostyrene, o,p-dipropylstyrene, p-cyanostyrene, o-methyl-p-decylstyrene, ureidoethyl vinyl ether, butyl vinyl sulfide, octyl vinyl sulfide, octadecyl vinyl sulfide, hydroxyethyl vinyl sulfide, N-vinyl-2-pyrrolidone, N-vinyl-5-methyl-2-pyrrolidone,
N-vinyl-4,4-dimethyl-2-pyrrolidone,
N-vinyl-4-butyl-5-octyl-2-pyrrolidone,
N-vinyl-6-methyl-2-piperidone,
N-vinyl-6-octyl-2-piperidone,
N-vinyl-2-oxohexamethylenimine,
N-vinyl-5,5-dimethyl-2-oxohexamethylenimine,
N-vinyl-4-butyl-5-octyl-2-oxohexamethylenimine, methyl vinyl sulfone, isobutyl vinyl sulfone, t-octyl vinyl sulfone, dodecyl vinyl sulfone, octadecyl vinyl sulfone, N-vinylethyleneurea, N-vinyltrimethyleneurea, N-vinyl-1,2-propyleneurea, N-vinylbutyleneurea, N-vinylcarbazole, vinyl acetate, vinyl stearate, dimethyl maleate, dioctyl maleate, dimethyl itaconate, dibutyl itaconate, dihexyl itaconate, dimethyl fumarate, diethyl fumarate, dioctyl fumarate, dibutyl fumarate, didodecyl fumarate, dibutyl maleate, dihexyl maleate, didecyl maleate, diethyl itaconate, dioctyl itaconate, didodecyl itaconate and 2-methyl-5-vinylpyridine.

It is understood that in many cases it will be desirable, and frequently preferred, to combine one or more of the above-described Formula I monomers with one or more of the above comonomers in order to achieve various modifications and properties in the product contemplated. It is, of course, necessary for the present purposes that the copolymers have sufficient oil solubility and, as will be apparent to one skilled in the art, the comonomer should be selected to impart this oil solubility.

Typical comonomers that impart oil solubility include acrylates and methacrylates in which the alcohol residue contains 6 to 18 carbon atoms, and itaconates, fumarates and maleates, in which the alcohol residue contains 6 to 24 carbon atoms. If a mixture of such esters, i.e., acrylates, methacrylates, fumarates, maleates, itaconates, mesaconates and/or citraconates is used, the alkyl moieties preferably average at least eight carbon atoms. Particularly useful in this respect are octyl, nonyl, dodecyl, isodecyl, isononyl, tridecyl, tetradecyl, octadecyl, phenyl, benzyl, cyclohexyl and alkylphenyl acrylates and methacrylates, itaconates, maleates and fumarates.

Another useful type of starting material comprises vinyl esters of monocarboxylic acids. Here, oil solubility can be controlled by the size of the hydrocarbon portion of the acid residue. If such ester or mixture of such esters is used to form the copolymer, it is usually desirable that the average group size be at least 8 carbon atoms.

There may also be employed with the monomers mentioned above, for final copolymer, minor proportions of others monomers, such as acrylic, methacrylic or itaconic acid, maleic anhydride, half esters of maleic, fumaric or itaconic acid, acrylamide, N-substituted acrylamides, methacrylamide, N-substituted methacrylamides, acrylonitrile, methacrylonitrile, vinyl esters of lower monocarboxylic acids, vinyl ethers, vinyl thioethers, vinyl ketones, vinyl chloride and vinylidene chloride.

It is preferred to employ the unsaturated esters containing an N-substituted formamide described in Formula I, with an alkyl ($C_1$–$C_{18}$) methacrylate, alkyl ($C_1$–$C_{18}$) acrylate, acrylamide, acrylonitrile, dialkyl ($C_1$–$C_{18}$) fumarate, dialkyl ($C_1$–$C_{18}$) maleate, styrene or vinyl esters. While in most instances the copolymers of the present invention are prepared from a Formula I compound, with one of the other listed monomers, it is quite satisfactory for many uses to employ additional monomers as desired in order to arrive at desired properties in the final product.

Homopolymers may be employed in the present compositions so long as they have sufficient oil solubility, as will be understood by those skilled in the art. Copolymers employed in the present compositions may be prepared in a wide range of percentages and molecular units. The valuable properties, described hereinbefore, are observed when as little as 0.4% by weight of the Formula I monomers are employed in the copolymer. It is generally preferable to use about 1% or more of the monomer described in Formula I. As an upper limit, it is preferred to use about 80% by weight of said monomer in the copolymer; however, the homopolymer may be employed.

Polymerization may be carried out in bulk when the monomers are liquids or low-melting solids, in solution, or in either suspension or emulsion. In bulk and solution polymerization, the reaction may be carried out without catalyst, initiated with light and heat, but it is preferred to use one or more of the peroxide or azo initiators which act as free radical catalysts, and are effective between 30° and 150° C. They may be employed in amounts of 0.01% to 10% or more by weight, preferably 0.01% to 1% by weight. Typical initiators include benzoyl peroxide, t-butyl peroxide, acetyl peroxide, capryl peroxide, t-butyl hydroperoxide, cumene hydroperoxide, t-butyl perbenzoate, diisopropylbenzene hydroperoxide, triisopropylbenzene hydroperoxide, methyl cyclohexane hydroperoxide, di-t-butyl peroxide, methylethyl ketone peroxide, azodiisobutyronitrile, azodiisobutyramide, dimethyl, diethyl or dibutyl azodiisobutyrate, azobis-($\alpha$,$\gamma$-dimethylvaleronitrile), azobis-($\alpha$-methylbutyronitrile), azobis($\alpha$-methylvaleronitrile), dimethyl or diethyl azobis-$\alpha$-methylvalerate and the like.

In conjunction with a hydroperoxide, it is desirable, but not absolutely essential, to supply an activator. Its effect seems at least in part to provide free radicals at somewhat lower temperatures than are effective for free radical formation from hydroperoxides in the absence of such activator.

Especially effective as activators are quaternary ammonium compounds. Typical compounds of this sort are benzyltrimethylammonium chloride,
dibenzyldimethylammonium bromide,
butyldimethylbenzylammonium chloride,
octyltrimethylammonium chloride,
dodecyldimethylbenzylammonium chloride,
nonylbenzyltrimethylammonium chloride,
dodecylbenzyldimethylbenzylammonium chloride,
didodecenyldimethylammonium chloride,
benzyldimethyldodecenylammonium chloride,
octylphenoxyethyldimethylbenzylammonium chloride,
diisobutylphenoxyethoxyethyldimethylbenzylammonium chloride,
octylpyridinium chloride,
N-octyl-N-methylmorpholinium chloride or
bis-quaternary salts, such as those having quaternary nitrogens linked with an alkylene group, an ether group or an amide-containing group.

The amount of activator is proportioned to the amount of hydroperoxide. Usually, the proportion of quaternary ammonium compound will be from 5% to 40% of the weight of the hydroperoxide.

Solution polymerization may be carried out in kerosenes, mineral oils, diesters, such as di(2-ethylhexyl)adipate or sebacate, chlorinated hydrocarbons, such as chloroform or ethylene dichloride, tributylphosphate, dibutyl phenyl phosphate, silicate esters or silicone fluids, benzene, toluene, xylene, solvent naphthas, dioxane, diisobutyl ketone, acetonitrile, dimethyl formamide, t-butyl alcohol and the like, depending on the solubilities of the monomers it is desired to use.

Emulsion polymerization is particularly effective with those members of the heterocyclic series which have low solubilities in water. There may be used in forming the emulsion nonionic or cationic emulsifiers, such as dodecyldimethylbenzylammonium chloride, dodecylbenzyltrimethylammonium chloride, cetylpyridinium chloride, alkylphenoxypolyethoxyethanols having alkyl groups of about 7 to 18 carbon atoms and 6 to 60 or more oxyethylene units, such as heptylphenoxypolyethoxyethanols,
octylphenoxypolyethoxyethanols,
methyloctylphenoxypolyethoxyethanols,
nonylphenoxypolyethoxyethanols,
dodecylphenoxypolyethoxyethanols and the like; polyethoxyethanol derivatives of methylene-linked alkyl phenols; sulfur-containing agents, such as those made by condensing 6 to 60 or more moles of ethylene oxide with nonyl, dodecyl, tetradecyl, t-dodecyl and the like mercaptans or with alkylthiophenols having alkyl groups of 6 to 15 carbon atoms; ethylene oxide derivatives of long-chained carboxylic acids, such as lauric, myristic, palmitic, oleic and the like or mixtures of acids, such as found in tall oil containing 6 to 60 oxyethylene units per molecule; analogous ethylene oxide condensates of long-chained alcohols, such as octyl, decyl, lauryl or cetyl alcohols, ethylene oxide derivatives of etherified or esterified polyhydroxy compounds having a hydrophobic hydrocarbon chain, such as sorbitan monostearate containing 6 to 60 oxyethylene units, etc.; also ethylene oxide condensates of long-chain or branched-chain amines, such as dodecylamine, hexadecylamine and octadecylamine, containing 6 to 60 oxyethylene groups, block copolymers of ethylene oxide and propylene oxide comprising a hydrophobic propylene oxide section combined with one or more hydrophilic ethylene oxide sections.

In the case of emulsion polymerization especially, a redox catalyst system is extremely effective. This includes the use of an organic peroxide, such as benzoyl peroxide, acetyl peroxide, capryl peroxide and the like, or an inorganic peroxide, such as hydrogen peroxide, ammonium persulfate, sodium persulfate, potassium persulfate or the like. The peroxidic catalyst is effectively coupled with a reducing agent, such as a sulfite, bisulfite, metasulfite or hydrosulfite of ammonium, sodium, potassium or the like.

Polymerization may also be intiated by high-energy irradiation. Suitable sources of high-energy irradiation are radioactive materials and electron accelerators. Useful as radioactive materials that supply gamma rays are irradiated isotopes, such as $Co^{60}$, fission products, such as $Cs^{137}$, adjuncts to fission reactants, such as radioactive xenon and the like. A $Co^{60}$ source is particularly effective. Useful as radioactive materials that supply beta rays are $Sr^{90}$ and the like. Valuable as electron accelerators, which supply beta rays, are the Van de Graaf generator, the resonant transformer and the like. Dosages in the range of 10,000 to 10,000,000 rep.'s, preferably 500,000 to to 2,000,000 rep.'s, are employed. A rep. is equivalent to the ionization produced by the absorption of 93 ergs of energy per gram of irradiated substance. Rep. stands for roentgen-equivalent-physical and is a unit of intensity and time.

The copolymerization of the monomers, described hereinbefore, may be conducted by mixing all of the monomers to be used at substantially the same time or one of the comonomers may be partially polymerized and then another comonomer or comonomers may be added at a later time either all at once or incrementally. The latter method is representative of block polymerization. A block copolymer may be prepared by polymerizing one of the monomers to the desired degree of polymerization under the influence of an anionic initiator, and then adding to the anionically formed polymer another ethylenically unsaturated monomer. Representative anionic initiators suitable for block polymerization include butyl lithium, fluorenyllithium, sodium naphthalene, triphenyl methyl sodium, sodium amide, phenyl magnesium bromide, benzyl sodium and phenyl isopropyl potassium. The anionic initiator is used in an amount from 0.01% to 8% or more of the weight of the first monomer polymerized and preferably 0.1% to 2%. Inert organic solvents that may be used include toluene, liquid ammonia, benzene, titrahydrofuran, alkylamines such as triethylamine, diethylamine and hexane. Mixtures of solvents such as toluene and triethylamine may also be employed. The block polymerization is conducted in an inert oxygen free atmosphere at a temperature of from minus 90° C. to plus 30° C. Generally a temperature of minus 10° C. or less is used. The block copolymers have proven to be effective dispersant polymers when employed in both lubricating oil and fuel compositions.

The copolymers of the unsaturated esters containing an N-substituted formamide monomer described in Formula I may also be prepared as a graft copolymer by carrying out the polymerization of the oil-solubilizing portion of the copolymer to about 40% to 100%, then adding the N-substituted formamide monomer either alone or in combination with another ethylenically unsaturated polymerizable monomer, preferably, but not necessarily, in the presence of a free-radical catalyst. The initiator and activator may be employed by incremental addition from time to time or all at once, as desired. Generally, the incremental addition is preferred.

The final copolymer may be taken up in a liquid, such as a petroleum oil or synthetic lubricant, and a concentrate, prepared in the range of about 10% to 60% of the copolymer. Volatile solvent and monomer may be volatilized from the mixture of copolymer and oil or synthetic lubricant. The concentrate is convenient for handling, stripping and blending.

Copolymers may be prepared over a wide range of molecular weight by variations in temperature, time, catalyst and particular monomers contemplated. Molecular weights determined by intrinsic viscosity method generally range from about 2,000 to 2,000,000 or more. The intrinsic viscosity of the novel polymers of this invention may vary from about 0.01 to about 2.0 or more as determined in toluene at 30° C. Low molecular weights are especially desirable when the polymers are to be resistant to shear. The high molecular weight polymers are desired when maximum thickening and other optimum properties are required. Regulation of molecular weights can be accomplished by standard methods, such as by the use of mercaptans, such as octyl mercaptan.

For purposes of determining the extent of copolymerization, there may conveniently be used a simple method which comprises isolating the copolymer from the reaction mixture, as by removal of a volatile solvent. Estimation of the extent of formation of the copolymer is particularly desirable in establishing the proper time of copolymerization for a given system in which proportions of initiator, concentrations and temperatures are fixed.

In one useful form of test for extent of copolymerization, a 1 gram sample of copolymerizing mixture is taken and dissolved in 5 mil. of benzene. The resulting solution is mixed with 15 ml. of methanol. Copolymer precipitates and is separated by centrifuging.

The compositions of the present invention are produced by incorporating from about 0.001% to 10% by weight of at least one of the above-described N-substituted formamide containing polymers in the oil or fuel base contemplated. For lubricant formulations, the polymers of the present invention are used in the amounts of 0.1% to 10.0%, preferably 0.2% to 2.0% by weight. In fuels, the range is 0.001% to 0.1%, preferably 0.005% to 0.05% by weight.

The compositions of the present invention posses the advantageous combination of a high degree of effectiveness with respect to dispersant-detergent properties, pour-point depressing action and viscosity improvements.

The following describes some of the test employed in evaluating the valuable compositions of the present invention.

DISPERSANCY TEST

A method for determining the dispersing activity of any given polymer is based on the capacity of the polymer to disperse asphaltenes in a typical mineral oil.

The asphaltenes are obtained by oxidizing a naphthenic oil with air under the influence of a trace of iron salt as catalyst, such as ferric naphthenate. The oxidation is desirably accomplished at 175° C. for 72 hours by passing a stream of air through a naphthenic oil. Pentane is added to the cooled, oxidized oil to form a sludge which may be separated by centrifuging. The sludge is freed from oil by extracting it with pentane. It is then taken up with chloroform and the resulting solution is adjusted to a solids content of about 2% (wt. per vol.).

When a polymer is to be examined for its dispersing activity, it is dissolved in a standard oil, such as solvent-extracted 170 neutral. Blends may be prepared to contain percentages varying from about 2% to 0.01% or even lower of polymer in oil.

A 10 ml. sample of a blend is treated with 1 ml. of the standard solution of asphaltenes in chloroform. The sample and reagent are thoroughly mixed in a test tube and the tube is placed in a forced draft oven at 90° C. for 2 hours to drive off volatile material. The tube is then allowed to cool and the appearance of the sample is noted.

If the polymer has dispersing activity, the oil will appear clear although colored.

Experience has demonstrated that, unless a polymer exhibits dispersing activity at concentrations below about 2% in the above test, it will fail to improve the cleanliness of engine parts in actual engine tests.

API SERVICE MS SEQUENCE V-A TEST

This test evaluates the sludge dispersant characteristics of a lubricant under low and medium temperature operating conditions. A single cylinder oil test engine is operated under conditions described in ASTM Special Technical Publication No. 315, published by the American Society for Testing and Materials, 1916 Race Street, Philadelphia, Pa., 19103.

The engine may be rated at any time during the course of the test. The 7 parts rated for sludge (CRC Merit, 10=clean) are the rocker arm assembly, rocker arm cover plate, valve deck, timing gear cover, push rod cover plate, push rod chamber and oil pan.

PANEL COKER TEST

This test is described in the record of the Fifth World Petroleum Congress (1959) in an article by R. M. Jolie, "Laboratory Screening Test for Lubricating Oil, Detergents and Dispersants." A sample of a compound under test is dissolved in a 170 SUS Mid-Continuent Solvent Extracted Neutral Oil containing 1% of a thermally unstable zinc dialkyldithiophosphate. The blend is placed in a heated sump and is splashed against a heated panel held at 570° F. for 2 hours. Gain in weight of the panel is determined and compared with oil without the test compound.

SUNDSTRAND PUMP TEST

In this test for distillate fuel oils, 1 liter of fuel oil containing 4 grams of synthetic sludge is treated with the additive. The oil is circulated for an hour through a Sundstrand oil burner pump containing a 100-mesh strainer. The sludge deposit is collected and weighed. (Nelson, Osterhaut and Schwindeman, Ind. Eng. Chem. 48, 1892 (1956).)

As will be clearly understood in the art, the fuels contemplated are distillate fuels that boil from 75° to 750° F. which includes gasolines, along with jet and diesel fuels and furnace oils. The present compounds are particularly useful in fuels that boil up to about 600° F., that is, the normal gasolines and jet fuels.

Lubricating compositions of this invention may be based on mineral oils or on synthetic lubricants. The mineral oils may vary over a wide range of viscosity, such as 1 to 25 centistokes at 210° F. These oils may be of naphthenic or paraffinic nature or may be of various mixtures. They may be distillates or mixtures of neutral oils and bright stocks. The lubricants may be bodied or gelled and used as greases, if desired. The oils may vary from spindle oils or hydraulic oils to oils for reciprocating aircraft engines. They include oils for sparking combustion and compression ignition engines, varying from grades identified as S.A.E. 5 to S.A.E. 50. Other types of lubricants are also included, such as hydraulic and automatic transmission fluids.

The synthetic lubricants include esters, such as dioctyl, dinonyl or isodecyl adipates, azelates or sebacates, polyethers and silicones. When use as hydraulic fluids is contemplated, phosphate esters are included as a base.

In the present compositions, there may also be used as a base, a transmission fluid, hydraulic fluid, gear oil or grease.

In the compositions of this invention, there may be used one of more other additives, such as anti-oxidants, anti-foam agents, anti-rust agents, anti-wear agents, heavy duty detergents, pour-point depressants, viscosity index improvers, or other type of additive. For example, there may be employed one or more of the dithiophosphates, such as zinc, barium, or nickel dialykyldithiophosphate, sulfurized oils, such as sulfurized sperm oil and sulfurized terpenes, alkylphenol sulfides, alkylaryl sulfonates, petroleum sulfonates whether normal or with alkaline reserve, such as calcium, barium or magnesium petroleum sulfonates, polymers and copolymers from alkyl acrylates, methacrylates, itconates, or fumarates or vinyl carboxylates and mixtures thereof, copolymers of acrylic esters and polar monovinylidene compounds, such as N-vinyl-2-pyrrolidone, vinylpyridines, aminoalkyl acrylates or methacrylates, or polyethyleneglycol acrylic esters, polybutenes, alkylphenol-alkylene oxide condensates, alkenylsuccinic anhydrides, various silicones and alkyl or aryl phosphates, such as tricresyl phosphates. There may also be used 4,4'-methylenebis-2,6-di-tert-butylphenol, trialkylphenols, tris-(dimethylaminomethyl)-phenol, phenothiazine, naphthylamines, N'-sec-butyl-N,N-dimethyl-p-phenylenediamine, alkaline earth alkylphenates, alkaline earth salicylates, calcium phenylstearate, alkylamines, especially $C_{12}$–$C_{24}$ alkylamines, cyclic amines, alkyl and aryl imidazolines and alkenyl succinic anhydrides reacted with amines and then with boron compounds, such as boron oxide, boron halides and boron esters.

While a pour-point depressant and a viscosity index improver may be added in addition to a copolymer of this invention, there may be used in place of such separate additives a copolymer of this invention which supplies not only dispersant action, but also one or both of these other actions. Thus, a copolymer of an ester described hereinbefore, which contains some alkyl groups of 16 or more carbon atoms, particularly cetyl or stearyl together with smaller groups, such as myristyl lauryl or octyl will lower the pour point of oils having a waxy pour-point and at the same time improve temperature-viscosity relationships. Improvements in viscosity index can be emphasized by the choice of substituents and such improvements can be had without lowering of pour-point if this is desired.

A turbo prop lubricant may be prepared by blending the copolymers of this invention with di-2-ethylhexyl sebacate and a mixture of polyesters formed by condensing 2-ethyl-1,3-hexanediol and sebacic acid into the polyesters with 2-ethylhexanol, there being an average of about 3 glycol units per molecule. This composition may also contain antioxidant, stabilizer or other useful additives.

The polymers are incorporated into fuels or lubricants according to standard procedures and according to the amounts set forth hereinbefore.

The compositions of the present invention may be more fully understood from the following illustrative examples. Parts by weight are used throughout.

Example 1

A monomer mixture was prepared from the following, 93.6 parts of lauryl-myristyl methacrylate, 8.0 parts of N-methacryloxyethyl-N-methylformamide having the structure

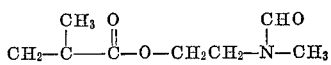

1.6 parts of azobisisobutyronitrile (AIBN, 12.5% solution in chloroform) and 30.0 parts of 100 SUS neutral oil. All of this mixture was charged to a polymerization vessel and nitrogen was sparged for at least 0.25 hour prior to initiating polymerization and during the entire reaction. The mixture was heated and when the temperature had reached 90° C., initiation of polymerization was observed, which was recorded as zero time. One-half hour after zero time, 0.8 part of a 12.5% solution of AIBN in chloroform was added and every 0.5 hour thereafter until 5.5 hours. At 6.0 hours, 128 parts of 100 SUS neutral oil was added. The resulting solution was analyzed for polymer content and shown to contain 38.0% copolymer representing a 99.5% yield. Kjeldahl nitrogen analysis of the isolated polymer indicaetd a 100% incorporation of N-methacryloxyethyl-N-methylformamide in the copolymer. The viscosity of a 38% solution of copolymer in oil was 1116 cs. at 210° F.

Example 1A

In the Panel Coker Test, a blend containing 2.6% of the product of Example 1 gives a deposit weight of 142 mg. The same oil without the additive gives a deposit weight of 250 mg.

In the Sundstrand Pump Test at 0.03 gram in 100 ml. of oil, the weight of slude is 68 mg., while the oil without any additive gives 221 mg.

6.5 parts of the product of Example 1 is blended with 1.0 part of a commercial zinc dialkyl dithiophosphate into 92.5 parts of a 170 SUS Mid-Continent Solvent Extracted Neutral Oil. The viscosity of this blend is 11.09 cst. at 210° F. and 61.99 cst. at 100° F. with a viscosity index of 146. The ASTM pour point is —30° F.

In the Dispersancy Test 0.06% polymer dispersed 0.2% asphaltenes at 90° C.

Example 2

A monomer mixture was prepared from the following, 140.2 parts of lauryl-myristyl methacrylate, 8.7 parts of N-methacryloxyisopropyl-N-ethylformamide having the structure

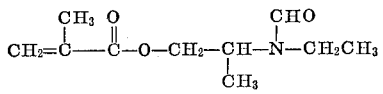

0.3 part of azobisisobutyronitrile and 45.0 parts of toluene. The mixture was charged to a polymerization vessel and nitrogen was sparged for at least 0.25 hour prior to initiating polymerization and during the entire reaction. When the reaction mixture reached 77° C. initiation occurred and this was called zero time. Five minutes thereafter incremental addition of 3.3 parts of compound II in 21.5 parts of toluene was begun until all the mixture had been added at 30 minutes. Additional shots of AIBN (1.2 parts of 12.5% chloroform solution) were made at 30 minute intervals beginning at 40 minutes time with the last addition at 220 minutes maintaining the reaction mixture all the while at approximately 90° C. The reaction was terminated at 240 minutes and analysis of the isolated copolymer indicated 100% incorporation into the copolymer of compound II. A 35% solution of the copolymer in 100 SUS neutral oil had a viscosity of 872 cs. at 210° F.

Example 2A 5.0 parts of the product of Example 2 is blended with 1.0 part of a commercial zinc dialkyl dithiophosphate into 94 parts of a 170 SUS Mid-Continent Solvent Extracted Neutral Oil. The viscosity of this blend is 9.36 cst. at 210° F. and 57.29 cst. at 100° F. with a viscosity index of 137. The ASTM pour point is —30° F.

Example 3

A monomer mixture was prepared from the following, 263 parts of lauryl-myristyl methacrylate, 45 parts of N - methacryloxyethylpolyethoxy - N - methylformamide having the structure

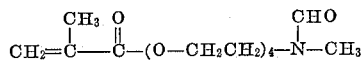

1.2 parts of diisopropylbenzenehydroperoxide (50% active ingredient in hexanol), 0.24 part diisobutylphenoxyethoxyethylbenzyl dimethyl ammonium chloride (25% active ingredient in hexanol) and 40 parts of 100 SUS neutral oil. This mixture was charged to a polymerization vessel and nitrogen was sparged for at least 0.25 hour prior to initiating polymerization and during the entire reaction. The mixture was heated and when the temperature had reached 115° C., initiation of polymerization was observed, which was recorded as zero time. At one hour elapsed time the first of four delayed additions of initiator/promoter (0.4 part/0.08 part) in 10 parts 100 SUS neutral oil was made with subsequent additions at 1.5 and 2.0 and 2.5 hours. At 3.5 hours, 370 parts of 100 SUS neutral oil was added and the solution was maintained at reaction temperature (115° C.) until 4.5 hours when the reaction was considered complete. The resulting solution was 38% copolymer and the 38% solution had a viscosity of 1650 cs. at 210° F.

Example 3A 4.0 parts of the product of Example 3 is blended with 1.0 part of a commercial zinc dialkyl dithiophosphate into 95.0 parts of a 170 SUS Mid-Continent Solvent Extracted Neutral Oil. The viscosity of this blend is 11.31 cst. at 210° F. and 64.30 cst. at 100° F. with a viscosity index of 145. The ASTM pour point is —25° F.

Example 4

Forty parts of 3,6-diformyl-3,6-diaza-decyl methacrylate having the structure

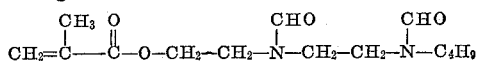

473 parts of lauryl-myristyl methacrylate, 50 parts of 100 SUS neutral oil and 8.0 parts of AIBN (12.5% in chloroform) were polymerized in a manner analogous to that described in Example 1. The reaction mixture after dilution with 100 SUS neutral oil analyzed for 42% copolymer and this 42% solution of copolymer had a viscosity of 2168 cs. at 210 F.

Example 4A 7.0 parts of the product of Example 4 is blended with 1.0 part of a commercial zinc dialkyl dithiophosphate, into 92.0 parts of a 100 SUS Mid-Continent Solvent Extracted Neutral Oil. The viscosity of this blend is 10.62 cst. at 210° F. and 64.22 cst. at 100° F. with a viscosity index of 140. The ASTM pour point is —35° F.

Example 5

A monomer mixture was prepared from the following, 93.6 parts of lauryl-myristyl methacrylate, 8.0 parts of N-acryloxy-ethyl-N-methylformamide having the structure

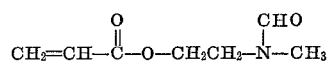

1.6 parts of AIBN (12.5% solution in chloroform), 0.05 part of lauryl mercaptan and 30 parts of 100 SUS neutral oil. Thirty percent (40 parts) of this mixture was charged to a polymerization vessel and nitrogen was sparged for at least 0.25 hour prior to initiating polymerization and during the entire reaction. The mixture was heated and when the temperature had reached 88° C., initiation of polymerization was observed, which was recorded as zero time. Twenty minutes after zero time the addition of the balance of the monomer mixture was begun and continued until 2.0 hours. At 2.5 hours, 0.8 part of a 12.5% solution of AIBN in chloroform was added and every 0.5 hour thereafter until 5.5 hours. At 6.0 hours, 128 parts of 100 SUS neutral oil was added. The resulting solution was analyzed for polymer content and shown to contain 36.8% copolymer. The viscosity of a 35.0% solution of this copolymer in 100 SUS neutral oil was 965 cs. at 210° F.

Example 5A 7.0 parts of the product of Example 5 is blended with 1.0 part of a commercial zinc dialkyl dithiophosphate, 2.0 parts of a basic calcium sulfonate (total base number=300) into 90 parts of a 170 SUS Mid-Continent Solvent Extracted Neutral Oil. The viscosity of this blend is 11.31 cst. at 210° F. and 65.26 cst. at 100° F. with a viscosity index of 144. The ASTM pour point is —25° F.

Example 6

A monomer mixture was prepared from the following, 735 parts of lauryl-myristyl methacrylate, 38 parts of di-(3-aza-3-formyl-heptyl)itaconate having the structure

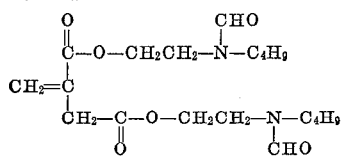

150 parts of toluene, and 1.5 parts of benzoyl peroxide. This monomer mixture was polymerized in a manner analogous to that described in Example 1. Five delayed additions of 0.45 part of benzoyl peroxide in 20 parts of toluene were made at 0.5 hour intervals beginning one hour after initiation. The reaction was considered complete at 6.0 hours. A 35% solution of copolymer in 100 SUS neutral oil had a viscosity of 952 cs. at 210° F.

Example 6A 6.5 parts of the product of Example 6 is blended with 1.0 part of a commercial zinc dialkyl dithiophosphate, into 92.5 parts of a 170 SUS Mid-Continent Solvent Extracted Neutral Oil. The viscosity of this blend is 9.82 cst. at 210° F. and 64.97 cst. at 100° F. with a viscosity index of 130. The ASTM pour point is —25° F.

Example 7

A monomer mixture was prepared from the following, 13.2 parts of cetyl-stearyl methacrylate, 30.8 parts of lauryl-myristyl methacrylate, 5 parts of N-methacryloxy-propyl-N-benzylformamide having the structure

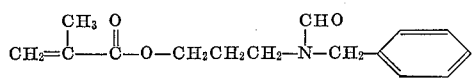

0.8 part of AIBN (12.5% solution in chloroform) and 7.5 parts of 100 SUS neutral oil. This monomer mixture was polymerized in a manner analogous to that described in Example 5. The reaction mixture after completion was diluted with 100 SUS neutral oil to give a solution containing 39% copolymer with a viscosity of 1035 cs. at 210° F.

Example 7A 10.0 parts of the product of Example 7 is blended with 1.0 part of a commercial zinc dialkyl dithiophosphate, into 89.0 parts of a 170 SUS Mid-Continent Solvent Extracted Neutral Oil. The viscosity of this blend is 9.90 cst. at 210° F. and 72.87 cst. at 100° F. with a viscosity index of 121. The ASTM pour point is —25° F.

Example 8

A monomer mixture was prepared from the following, 22 parts of n-butyl methacrylate, 48 parts of isodecyl methacrylate, 30 parts of cetyl-stearyl methacrylate, 3 parts of 4,7-diformyl-4,7-diazo-octyl methacrylate having the structure

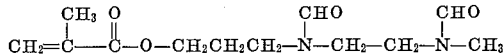

30 parts of 100 SUS neutral oil and 1.6 parts of AIBN (12.5% solution in chloroform). This monomer mixture was polymerized in a manner analogous to that described in Example 1. After completion of the polymerization the polymer solution was further diluted with 100 SUS neutral oil to give a 40% solution of copolymer which had a viscosity of 1162 cs. at 210 F.

Example 8A 6.0 parts of the product of Example 8 is blended with 1.0 part of a commercial zinc dialkyl dithiophosphate, into 93.0 parts of a 170 SUS Mid-Continent Solvent Extracted Neutral Oil. The viscosity of this blend is 10.92 cst. at 210° F. and 62.30 cst. at 100° F. with a viscosity index of 145. The ASTM pour point is —25° F.

Example 9

A monomer mixture was prepared from the following, 147 parts of cetyl-stearyl methacrylate, 343 parts of lauryl-myristyl methacrylate, 25 parts of di(3-aza-3-formyl-hexyl)fumarate having the structure

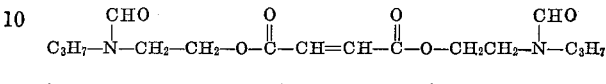

1.0 part of AIBN and 100 parts of toluene. This monomer mixture was polymerized in a manner analogous to that described in Example 1. Ten delayed additions of 0.25 part of AIBN in 2 parts of chloroform were made at 0.5 hour intervals beginning one hour after initiation with the final addition at 5.5 hours. The reaction was considered complete at 6.0 hours. A 35% solution of copolymer in 100 SUS neutral oil had a viscosity of 865 cs. at 210° F.

Example 9A 6.0 parts of the product of Example 9 is blended with 1.0 part of a commercial zinc dialkyl dithiophosphate, into 93.0 parts of a 170 SUS Mid-Continent Solvent Extracted Neutral Oil. The viscosity of this blend is 10.78 cst. at 210° F. and 69.69 cst. at 100° F. with a viscosity index of 135. The ASTM pour point is —35° F.

Example 10

A 4-neck, 500 cc. flask was equipped with a stirrer, thermometer, an inert gas inlet and exit tubes. Fluorenyllithium (0.002 mole) in tetrahydrofuran (2.1 moles) was added to the flask and maintained at —70° C. Decycloctyl methacrylate (0.29 mole) was added gradually to the fluorenyllithium solution with nearly instantaneous conversion to polymer achieved. There was then added to this solution N-methacryloxyethyl-N-methylformamide (0.04 mole). After a suitable holding period the reaction was quenched with methanol. The block copolymer which was isolated by precipitation had a nitrogen content of 0.41%.

Example 10A 5.3 parts of the product of Example 10 is blended with 1.0 part of a commercial zinc dialkyl dithiophosphate, 5.0 parts of a commercial polyalkylmethacrylate into 88.7 parts of a 170 SUS Mid-Continent Solvent Extracted Neutral Oil. The viscosity of this blend is 11.32 cst. at 210° F. and 62.38 cst. at 100° F. with a viscosity index of 147. The ASTM pour point is —30° F. This blend is evaluated in the Sequence V–A test giving a sludge rating at the end of 75 hours of engine operation of 678 (70.0=clean). The value for the reference oil alone is 39.7.

Example 11

A copolymer was prepared according to the procedure of Example 1 containing 4.4% N-methacryloxyethyl-N-methylformamide. The polymer was prepared as a 48.3% concentrate in 100 SUS neutral oil and this product was evaluated in the Sundstrand Pump Test and Sequence V–A test.

Example 11A

In the Sundstrand Pump Test 0.02 gram of the above product in 100 ml. of oil gave a filter weight of 217 mg., while the oil without any additive gives 262 mg.

4.2 parts of the above product is blended with 1 part of a commercial zinc dialkyl dithiophosphate into 94.8 parts of a 170 SUS Mid-Continent Solvent Extracted Neutral Oil. The viscosity of this blend is 10.58 cst. at 210° F. and 62.82 cst. at 100° F. with a viscosity index of 141. The ASTM pour point is —25° F. This blend is evaluated in the Sequence V–A test giving a sludge rating at the end of 75 hours of engine operation of 64.0 (70.0= clean). The value for the reference oil alone is 39.7.

Example 12

A copolymer was prepared according to the procedure of Example 1 containing 0.5% N-methacryloxyethyl-N-methylformamide. The polymer was prepared as a 42% concentrate in 100 SUS neutral oil and this product was evaluated in the Sundstrand Pump Test and Sequence V–A test.

Example 12A

In the Sundstrand Pump Test at 0.03 gram in 100 ml. of oil, the weight of sludge is 189 mg., while the oil without any additive gives 221 mg.

10.0 parts of the product of Example 12 is blended with 1.0 part of a commercial zinc dialkyl dithiophosphate into 89.0 parts of a 170 SUS Mid-Continent Solvent Extracted Neutral Oil. The viscosity of this blend is 10.56 cst. at 210° F. and 61.01 cst. at 100° F. with a viscosity index of 143. The ASTM pour point is −30° F.

Example 13

A block copolymer from equal parts of lauryl-myristyl methacrylate and N-methacryloxyethyl - N - decylformamide having the structure $$CH_2=C(CH_3)-\underset{O}{\overset{O}{\|}}C-O-CH_2-CH_2-\underset{C_{10}H_{21}}{\overset{CHO}{N}}$$

was prepared according to Example 10 except that phenyl isopropyl potassium was employed as the anionic initiator. The product functioned as a satisfactory dispersant polymer.

Example 14

In a manner similar to Example 1 the following N-substituted formamide monomers within the scope of Formula I were employed:

(a) N-acryloxyethyl-N-dodecylformamide $$CH_2=CH-\underset{}{\overset{O}{\|}}C-O-CH_2-CH_2-\underset{C_{12}H_{25}}{\overset{CHO}{N}}$$

(b) N-methacryloxyethyl-N-cyclohexylformamide $$CH_2=C(CH_3)-\overset{O}{\|}C-O-CH_2CH_2-\underset{C_6H_{11}}{\overset{CHO}{N}}$$

(c) N-methacryloxyethyl-N-butylphenylformamide $$CH_2=C(CH_3)-\overset{O}{\|}C-O-CH_2CH_2-\underset{C_6H_4-C_4H_9}{\overset{CHO}{N}}$$

(d) N-methacryloxyethyl(polyoxyethyl)$_{26}$ - N - methylformamide $$CH_2=C(CH_3)-\overset{O}{\|}C-O-CH_2CH_2(-O-CH_2CH_2)_{26}-\underset{CH_3}{\overset{CHO}{N}}$$

(e) N - methacryloxyethyl(polyethoxy)$_{18}$ - N,N' - diformyl-N'-n-decylhexamethylene diamine $$CH_2=C(CH_3)-\overset{O}{\|}C-O-CH_2CH_2-(CH_2CH_2-O)_{18}-\underset{}{\overset{CHO}{N}}-(CH_2)_6-\underset{C_{10}H_{21}}{\overset{CH}{N}}$$

(f) N-(5-hexenoyloxyethyl)-N-methylformamide $$CH_2=CHCH_2CH_2CH_2-\overset{O}{\|}C-O-CH_2CH_2-\underset{CH_3}{\overset{CHO}{N}}$$

(g) Hexyl (3-aza-3-formyl-hexyl)fumarate $$H_{13}C_6O-\overset{O}{\|}C-CH=CH\overset{O}{\|}C-O-CH_2CH_2-\underset{C_3H_7}{\overset{CHO}{N}}$$

(h) Lauryl (3-aza-3-formyl-butyl)fumarate $$H_{25}C_{12}-O-\overset{O}{\|}C-CH=CH-\overset{O}{\|}C-O-CH_2CH_2-\underset{CH_3}{\overset{CHO}{N}}$$

(i) Di(3-aza-3-formyl-butyl)itaconate $$CH_2=C\begin{cases}\overset{O}{\|}C-OCH_2CH_2-\underset{CH_3}{\overset{CHO}{N}}\\ \overset{O}{\|}C-OCH_2CH_2-\underset{CHO}{\overset{CH_3}{N}}\end{cases}$$

(j) Di(3-aza-3-formyl-butyl)mesaconate $$H_3C-\underset{CH_3}{\overset{CHO}{N}}-CH_2CH_2-CH=\underset{}{\overset{CH_3}{C}}-\overset{O}{\|}C-O-CH_2CH_2-\underset{CH_3}{\overset{CHO}{N}}$$

Although the novel polymers of this invention are generally intended to be used as additives to lubricating oils and fuels, other uses have been found. The homopolymers of the Formula I monomers may be mixed with other film-forming materials, such as vinyl and acrylic resins, and may be pigmented or dyed to provide heat-cured decorative coatings on such substances as wood, metal and glass surfaces. In a similar manner the copolymers of this invention may be blended with other resins, such as aminoplasts, vinyl or acrylic resins such as polyvinylchloride, polymethyl methacrylate and the like to form useful coating compositions.

I claim:
1. A composition comprising a major portion of a member selected from the group consisting of a lubricating oil and a normally liquid hydrocarbon fuel and a minor portion, sufficient to impart dispersancy, of an oil-soluble copolymer prepared from (1) at least one monomer selected from the group consisting of (a) ($C_1$–$C_{24}$)alkyl esters of an acid selected from acrylic and methacrylic acids, (b) dialkyl fumarates of up to 24 carbon atoms, (c) dialkyl maleates of up to 24 carbon atoms, (d) dialkyl itaconates of up to 24 carbon atoms, (e) dialkyl mesaconates of up to 24 carbon atoms, and (f) dialkyl citraconates of up to 24 carbon atoms, and mixtures of any of the esters of (a), (b), (c), (d), (e), or (f) wherein the alkyl moieties average at least eight carbon atoms, vinyl esters of ($C_1$–$C_{24}$) fatty acids, styrene, α-methylstyrene, and alkyl ring-substituted styrenes containing no more than a total of about 20 carbon atoms, and (2) at least one monomer of the formula

$$E-[(O-A)_x-\underset{R_2}{\overset{CHO}{N}}-[(CH_2)_z-CH-\overset{CHO}{N}-]_yR_1]_t$$

wherein
E represents an acyl radical that is the residue of an unsaturated monocarboxylic acid having up to 6 carbon atoms, a lower unsaturated dicarboxylic acid, or a lower unsaturated dicarboxylic acid half ester of a ($C_1$–$C_{24}$)alkanol,
A is an alkylene group having 2 to 4 carbon atoms,
$R_1$ is a ($C_1$ to $C_{24}$)alkyl group, a ($C_5$ to $C_7$)cyclic aliphatic group, phenyl, benzyl, or a ($C_1$ to $C_4$)alkyl-substituted phenyl,
$R_2$ is hydrogen or methyl,
t is an integer having a value of from 1 to 2,
x is an integer having a value of from 1 to 30,
y is an integer having a value of from 0 to 4, and
z is an integer having a value of from 1 to 5.
2. A composition according to claim 1 in which there is employed at least 0.1% and up to about 10% by weight of said copolymer in a lubricating oil.
3. A composition according to claim 1 in which there is employed at least 0.001% and up to about 0.1% by weight of said copolymer in a hydrocarbon fuel.
4. A composition according to claim 1 in which said monomer (1) is ($C_1$–$C_{18}$)alkyl methacrylate.

5. A composition according to claim 1 in which said monomer (1) is ($C_1$–$C_{18}$)alkyl acrylate.

References Cited

UNITED STATES PATENTS 3,010,810  11/1961  Stayner et al. _____ 44—62
3,163,605  12/1964  Koch et al.

DANIEL E. WYMAN, Primary Examiner

W. J. SHINE, Assistant Examiner

U.S. Cl. X.R.

44—62, 66, 71